United States Patent
Mitchell

(10) Patent No.: US 11,392,975 B2
(45) Date of Patent: Jul. 19, 2022

(54) BRAND SONIFICATION

(71) Applicant: AUDIO ANALYTIC LIMITED, Herefordshire (GB)

(72) Inventor: Christopher James Mitchell, Cambridge (GB)

(73) Assignee: AUDIO ANALYTIC LIMITED, Cambridge (GB)

( * ) Notice: Subject to any disclaimer, the term of this patent is extended or adjusted under 35 U.S.C. 154(b) by 1593 days.

(21) Appl. No.: 14/777,894

(22) PCT Filed: Mar. 21, 2014

(86) PCT No.: PCT/GB2014/050895
§ 371 (c)(1),
(2) Date: Sep. 17, 2015

(87) PCT Pub. No.: WO2014/147417
PCT Pub. Date: Sep. 25, 2014

(65) Prior Publication Data
US 2016/0283967 A1    Sep. 29, 2016

Related U.S. Application Data

(60) Provisional application No. 61/804,267, filed on Mar. 22, 2013.

(51) Int. Cl.
G06Q 30/02    (2012.01)
G10L 25/51    (2013.01)
H04R 29/00    (2006.01)

(52) U.S. Cl.
CPC ..... *G06Q 30/0231* (2013.01); *G06Q 30/0226* (2013.01); *G10L 25/51* (2013.01); *H04R 29/00* (2013.01)

(58) Field of Classification Search
CPC .......... G02B 27/0172; G06Q 30/0269; G06Q 30/0255; G06Q 30/0207–0277;
(Continued)

(56) References Cited

U.S. PATENT DOCUMENTS 5,130,696 A * 7/1992 Liebman .................. G08B 3/10
84/94.2
6,299,006 B1* 10/2001 Samonek ............. B65D 51/248
215/310

(Continued)

FOREIGN PATENT DOCUMENTS

| EP | 1989879 B1 | 12/2008 |
|---|---|---|
| WO | 2012048027 A1 | 4/2012 |
| WO | 2013012952 A1 | 1/2013 |

OTHER PUBLICATIONS

International Search Report and Written Opinion for PCT/GB/2014/050895, dated Jul. 14, 2014, pp. 1-9.

*Primary Examiner* — Chinyere Mpamugo
(74) *Attorney, Agent, or Firm* — Tarolli, Sundheim, Covell & Tummino LLP

(57) ABSTRACT

A mobile device comprising a software application configured to detect the sound of a product use event; provide a user reward using said software application in response to said detection; capture data relating to said product use event; and provide said captured data to a remote computer system for analysis.

11 Claims, 4 Drawing Sheets

(58) Field of Classification Search
CPC .... G06Q 30/02; G06Q 50/34; G06Q 30/0231; G06Q 30/0241; G06Q 50/20; G06Q 30/0226; G06Q 30/0261; G06Q 30/0246; G06Q 30/0235; G06Q 30/0267; G06Q 10/087; G06F 16/951; G06F 16/634; G06F 16/68; G06F 16/683; G06F 16/7834; G06F 3/167; H04L 67/306; H04L 51/38; H04L 12/2803; H04L 67/125; G10L 25/51; G10L 19/018; G10L 21/0208; G10L 21/0224; G10L 21/0308; G10L 25/84; H04R 29/00; H04H 60/58; H04H 60/39; H04H 60/45; H04H 60/66; H04H 2201/90; H04M 11/00; H04M 11/007; H04M 2201/12; H04M 2201/18; H04M 2201/36; H04M 2207/18; H04M 3/2281; H04M 3/42221; H04M 3/4878; H04M 3/493; H04N 21/25883; H04N 21/25891; H04N 21/42202; H04N 21/4394; H04N 21/44218; H04N 21/2407; H04N 21/26603; H04N 21/812; H04W 4/33; H04W 4/80; H04W 76/14; H04W 84/12; H04W 84/18; H04W 4/029; H05B 47/12; H05B 47/19

See application file for complete search history.

(56) References Cited

U.S. PATENT DOCUMENTS

| | | |
|---|---|---|
| 2005/0147256 A1 | 7/2005 | Peters et al. |
| 2011/0125063 A1* | 5/2011 | Shalon ................ A61B 5/1112 600/590 |
| 2012/0059495 A1 | 3/2012 | Weiss et al. |
| 2014/0150006 A1* | 5/2014 | Vemparala ......... H04N 21/4532 725/18 |
| 2014/0245335 A1* | 8/2014 | Holden .............. H04N 21/4223 725/12 |
| 2014/0257959 A1* | 9/2014 | Chung ............... G06Q 30/0226 705/14.27 |
| 2015/0317756 A1* | 11/2015 | Agiv .................... G06Q 30/02 705/7.35 |

* cited by examiner

BRAND SONIFICATION

RELATED APPLICATIONS

The present invention is a U.S. National Stage under 35 USC 371 patent application, claiming priority to Serial No. PCT/GB2014/050895, filed on 21 Mar. 2014; which claims priority from U.S. Provisional Patent Application No. 62/804,267, filed 22 Mar. 2013, the entirety of both of which are incorporated herein by reference.

FIELD OF THE INVENTION

The present invention relates to identifying sounds emitted by a consumer product when activated, used or opened, and in particular to sounds emitted by the opening of packaging of fast moving consumer goods such as soft drinks.

BACKGROUND TO THE INVENTION

Background information on sound identification systems and methods can be found in the applicant's PCT application WO2010/070314, which is hereby incorporated by reference in its entirety.

The term "brand sonification" describes the use of sounds (typically non-verbal sounds) to convey brand related information. Many brands today are associated with a specific sound, such that when a consumer hears the sound, they immediately think of the associated brand. Current commonly known examples include the Intel® "Intel inside" jingle or McDonald's Corporation's five-note "I'm lovin' it" jingle. However, brand sonification is not limited to sounds, jingles or themes that are specially created for a brand, but also encompasses the sounds created by branded goods when they are activated, used or opened. For example, the sounds made when a canned beverage is opened or when computer equipment is booted-up can also convey brand information. Such sounds may make up a significant proportion of an advertising campaign, e.g. within a promotional video or radio advertisement.

The present applicant has recognized the need to be able to identify sounds created by such branded goods when they are used or activated.

SUMMARY OF THE INVENTION

As mentioned above, "brand sonification" is the characteristic sound that a product emits when activated, used or opened. The product could include, but not be limited to: food or beverages; home or personal care products in primary packaging which emits a sound on opening; computer equipment or software applications which emit or cause to emit a sound on power-up or activation; and any other product that emits a sound when used or activated. For example, the opening of a pressurized beverage or the opening of a packet of crisps/chips may generate particular sounds that are characteristic of a particular brand.

Generally speaking, a system to detect the sound of a product use event comprises a microphone, processing unit, software, decision-making process and possibly connectivity to other systems. The system has the capability to detect the brand sonification distinct from other sounds, e.g. from background sounds associated with where the product is used (e.g. at work or in a park). Having detected the brand sonification, the system can initiate a further process which can either:

Provide a level of interactivity with the user of the product, including but not limited to: linking to on-line content; activating specific software applications; initiating taking of photographs; issuing rewards of some form to the user; etc.; or Provide data to an information system (i.e. to the remote computer system) which records or analyses data relating to product usage or consumer behavior.

Thus, according to a first aspect of the invention, there is provided a mobile device comprising a software application configured to: detect the sound of a product use event; provide a user reward using said software application in response to said detection; capture data relating to said product use event; and provide said captured data to a remote computer system for analysis.

Preferably, the mobile device is a mobile telephone, a smartphone, a tablet computer etc. The sound is received by a microphone located within the mobile device. A software application running on the mobile device may be configured to interact with the microphone to detect the sound. A processing unit within the mobile device or hosted on 'the cloud' may perform the sound identification analysis. In particular, the processing unit determines whether the detected sound matches stored sound models.

In embodiments, the sound of a product use event is detected by alternative electronic goods such as a camera or a beverage and/or food vending machine. This is described in more detail below.

In embodiments, the sound of the product use event comprises the sound of opening a package of the product. For example, the software application may be configured to distinguish between the sound of a pressurized beverage can being opened and the sound of a pressurized beverage bottle being opened, and even between the sounds of different sized bottles and cans being opened (e.g. between 500 ml, 1 l, 1.5 l bottles etc.).

Preferably, this may be the sound of a can ring-pull/tab opening event on a can of pressurized beverage, and/or the sound of a screw cap twisting and opening event on a beverage bottle. However, as mentioned above, the sound could be associated with the opening of a bottled beverage, the booting of a PC, the opening of packaging of a food item, the consuming of a crunchy food product etc.

In embodiments, the captured data is location data of the mobile device when the sound is detected and/or date and time data linked to when the sound is detected. The location of the mobile device may be determined using a GPS-capability of the mobile device or other similar means. The location and time/date information of the product use event may be transmitted to a remote computer system run by the owner of the identified brand, in order to provide the brand owner with precise information on the usage of their products. Such information may, for example, enable a brand owner to determine that one of their products is typically used by consumers on weekdays at lunchtime.

In embodiments, upon detection of the sound, the user may be rewarded by access to exclusive media, such a video or music file. Additionally or alternatively, the user reward is a monetary reward such as a fixed or percentage discount off a future purchase.

In embodiments, the user reward is only delivered when the software application has detected a specific number of product use events. This may incentivise the user to utilize the software application, and also provides the brand owner with a fixed amount of usage data before permitting a reward to be delivered to the user.

In a related aspect of the invention there is provide a non-transitory data carrier carrying processor control code for the above-mentioned software application.

According to a further aspect of the invention, there is provided a method of capturing product use data from users of a product, the method comprising: providing a mobile device with an app configured to identify use of said product from a sound of said use and to provide an interactive user experience in response to said identification; and capturing use data of said product during use of said app.

In embodiments, the method of capturing product use data comprises modifying the product to increase a distinctiveness of the product sound.

For example, in a particular embodiment, a can ring-pull/tab on a can of pressurized beverage may be provided with ridges, grooves and/or indentations to increase the distinctiveness of the product sound as the ring-pull is being activated to open the can.

In another embodiment, a screw cap on a beverage bottle is connected to a band (e.g. a tamper-evident band) by a plurality of breakable thin connectors, and the screw cap, the band and/or the plurality of thin connectors may be modified to increase the distinctiveness of the product sound when the screw cap is twisted and the thin connectors are broken (to disconnect the screw cap from the tamper-evident band).

According to another aspect of the invention, there is provided a method of capturing product use data from users of a product, the method comprising: providing a consumer electronic device having at least one microphone with access to audio analytic software configured to analyze audio data captured by said microphone to identify a sound associated with use of said product; using said consumer electronic device to identify when said product is used from said sound of use of said product; and capturing data relating to said use of said product in response to said identification.

Preferably, the method of capturing product use data comprises providing the consumer electronic device with an interactive software application having access to audio analytic software, wherein the interactive software application is configured to enable user interaction with the consumer electronic device in response to the sound identification.

In particular embodiments, the audio analytic software is provided within the consumer electronic device. Thus, the consumer electronic device, e.g. a mobile telephone or tablet computer, is able to perform the sound identification itself.

Alternatively, the audio analytic software may be provided on a network of remote servers hosted on the Internet (i.e. 'the cloud'), and the captured audio data may be transmitted to the remote servers for the analysis. This may be preferred in certain circumstances, such as when the consumer electronic device lacks the processing power to be able to perform the audio analysis/sound identification. Thus, the processor of the consumer device may be configured to receive the audio data and event data and transmit the data to 'the cloud' for analysis.

In both embodiments (i.e. local or cloud-based processing), the interactive software application has access to one or more sound models and the audio analytic software compares the captured audio data with the one or more sound models to identify the sound.

Preferably, the one or more sound models are updated and improved using the audio data captured by the and each consumer electronic device using the audio analytic software.

In the case where the audio analytic software and the one or more sound models are provided on the network of remote servers, audio data captured from one or more consumer electronic devices is transmitted to the remote servers to enable the one or more sound models to be updated.

Alternatively, in the case where the audio analytic software is provided within the consumer electronic device, the updated sound models are delivered to the consumer electronic device such that the software can access the updated models locally (i.e. within the device).

In a related aspect of the invention, there is provided a can of pressurized beverage having a ring-pull or push-tab in a top of the can, wherein one or both of said ring-pull/push-tab and said can top are configured to interact with one another on opening to generate a distinctive can-opening sound in addition to a sound made by breaking of the frangible seal of the tab and escape of pressurized gas from within the can.

In a further related aspect of the invention, there is provided a marketing data collection system comprising the above-described mobile device in combination with the above-mentioned remote computer system.

According to an aspect of the invention, there is provided a system for identifying a sound associated with a product use event, the system comprising: non-volatile memory for storing one or more sound models and for storing processor control code; a sound data input; a processor coupled to said sound data input and to said stored processor control code, wherein said processor control code comprises code to: input, from said sound data input, sample sound data for said sound associated with said product use event to be identified; input event data associated with said sound data input; compare said sample sound data with said stored one or more sound models; identify a product associated with said sample sound data; and deliver an interactive user experience associated with said identification to a user of said product.

As mentioned earlier, the sound of a product use event may be detected by a mobile device but also by consumer electronic devices such as, but not limited to, home or office PCs, video game consoles, digital camcorders, or digital cameras, or by commercial electronic devices such as vending machines. Thus, in embodiments, the sound data is captured by a consumer electronic device or a vending machine, and wherein the captured sound is transmitted by said consumer electronic device or said vending machine by a wired or wireless connection to the system for processing.

Many digital cameras have the capability to record moving videos with sound (i.e. they also have a microphone). Thus, a digital camera may be able to detect the sound of a product use event. In this case, the computational capability of the camera's processor may not be sufficient to perform the sound analysis. However, many digital cameras can be wired or wirelessly connected to other devices (e.g. PCs, laptops etc.) or have internet capability such that they can use mobile networks or wireless connections to share data with other devices (e.g. mobile devices) or with social networking services. The audio analytic software may be provided on a network of remote servers hosted on the Internet (i.e. 'the cloud') or may be provided on a further electronic device (e.g. a mobile device), and the audio data captured by the digital camera may be transmitted to the remote servers or the further electronic device for the analysis. The camera may also transmit information about the time and date of the sound capture, which may provide a brand owner with useful information about when their product is being consumed/used. The 'reward' or interactive user experience may be delivered to the user via email (e.g. using the email address used when registering the product), by SMS/MMS to a mobile phone associated with the user of the camera, to the camera itself, to the user's social network profile, or by other means.

Vending machines typically dispense food items and beverages, but may dispense other types of consumer goods such as alcohol, cigarettes, hygiene products etc. Modern vending machines may have interactive touch screens, video analytics to recognize the gender and age of the user, and cloud manageability of sales and inventory. Thus, vending machines may have or may be provided with microphones to enable the machines to detect the sound of a product use event. Users of the vending machine may use a product (e.g. open a beverage container or snack packaging) as soon as the good has been dispensed by the machine, and the microphone can detect the sound. As with the camera example above, the vending machine itself may not have the processing power to be able to perform the sound analysis itself, but may transmit the audio data to a further device or to 'the cloud' for analysis. The vending machine may also transmit data on the time and day of the sound detection, and data identifying the machine (which can help a brand owner determine the geographical location of the machine). The 'reward' or interactive user experience delivered to the user may in this case be a voucher or code for a monetary or percentage discount off a future purchase, which may incentivise the user to use the same vending machine in the future or to purchase the same product again. The voucher or code may be delivered to the vending machine user via the display or interactive touch screen on the vending machine, or by prompting the machine to print out a voucher/code for the user to take with them.

Accordingly, in a related aspect of the invention there is provided a vending machine comprising a software application configured to: detect the sound of a product use event; provide a user reward using said software application in response to said detection; capture data relating to said product use event; and provide said captured data to a remote computer system for analysis.

The skilled person will understand that many other types of electronic goods (both consumer goods and commercial) can be configured to detect the sound of a product use event and to transmit the audio data to a further device or to 'the cloud'. The skilled person will further understand that features of embodiments and aspects of the invention described herein as incorporated into or associated with a mobile device may similarly be incorporated into or associated with another device such as a vending machine, games console, or other device as described above.

The invention also provides processor control code for the above-described systems and methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

The invention is diagrammatically illustrated, by way of example, in the accompanying drawings, in which.

DETAILED DESCRIPTION OF THE DRAWINGS

1. Brand Sonification

Figure 1:
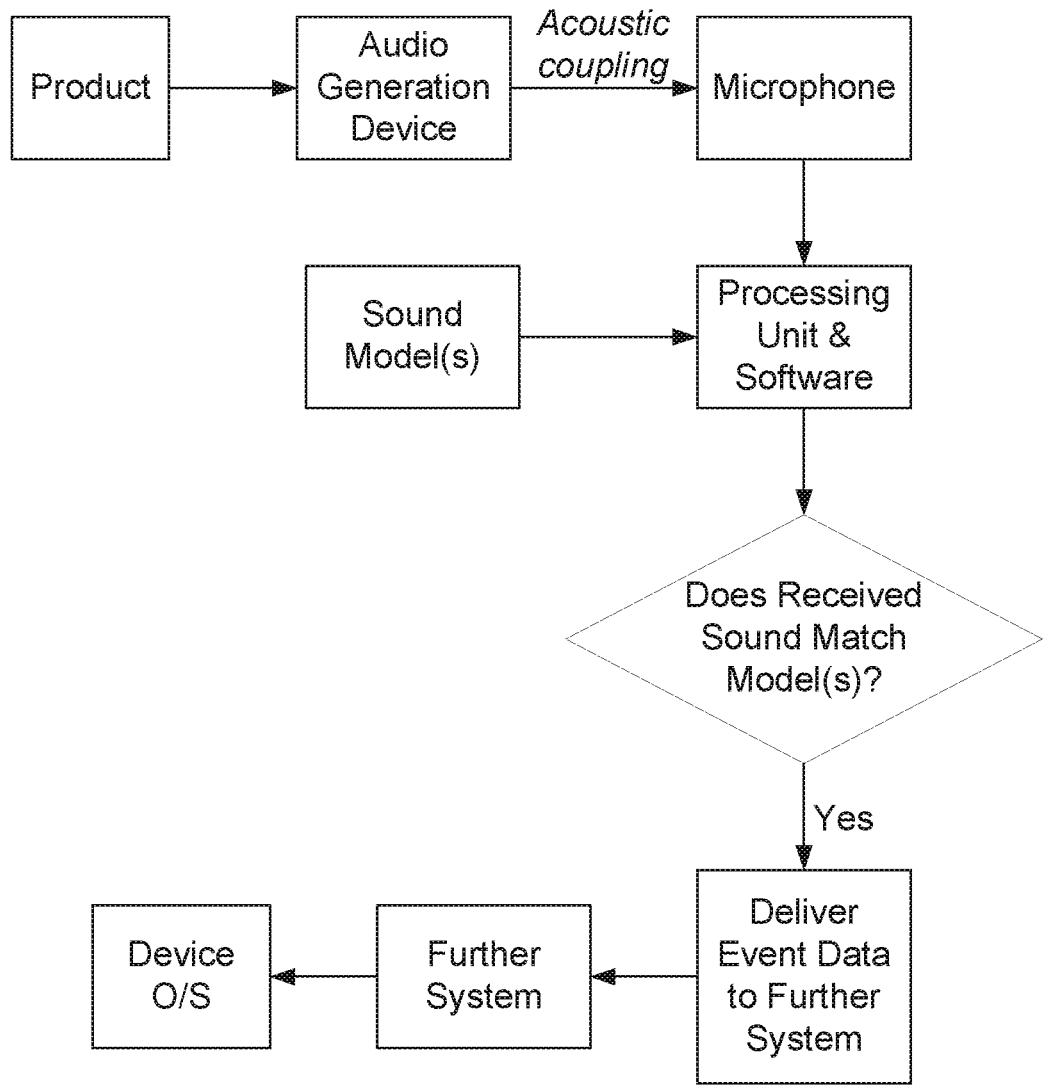
FIG. 1 shows a process to detect brand sonification in an embodiment of the invention.

FIG. 1 shows a general process to detect brand sonification in an embodiment of the invention. A sound is generated by a product when it is used, activated or opened. For example, the opening of a pressurized beverage or the opening of a packet of crisps/chips may generate particular sounds that are characteristic of a particular brand. The sound is generated by an audio generation device of the product. For instance, on a pressurized beverage can, the pulling of a ring-pull or pull-tab on the lid can generates a sound as a scored part of the lid comes away from the rest of the can lid. In another example, the pulling apart of a crisp/chip packet when opening may generate audio. In a further example, the consuming of the crisps/chips within the packet may in itself generate audio which is characteristic of a particular brand, e.g. the crunching sound.

In the illustrated embodiment, the brand sonification detection is performed using a mobile device comprising a software application. The mobile device may be a mobile telephone, a smartphone, a tablet computer etc. The software application is configured to detect the sound, capture data relating to detected sound, provide a user with a 'reward' and forward the captured data to a remote computer system for analysis—these processes are described in more detail below.

Generally, the sound is received by a microphone located within the mobile device via acoustic coupling (e.g. using an acoustic coupler or similar device within the mobile device). The software application may be configured to activate when the microphone detects a sound. The microphone sends the signal to a processing unit. As is described below in more detail, in particular embodiments, the processing unit within the mobile device may perform the sound identification analysis, while in alternative embodiments, an external processing unit may perform the analysis.

The processing unit and software (either within the mobile device or external to it) determine whether the received sound matches particular stored sound models. In general, the sound models are generated in two ways:

By reducing thousands of similar sounds into their constituent parts to enable a model to be generated for a particular class of sounds. This is achieved by collecting thousands of hours of audio recordings, in a wide range of environments using a wide variety of different recording equipment. For example, for brand sonification, the audio recordings may be of different products being used, activated or opened (e.g. beverage containers being opened, crisps/chips being eaten, software applications being initialized) in different environments (e.g. home, office, in a park, in a café etc.). This sound data allows product use to be identified in the presence of a range of different background sounds. Received audio data is compared to the stored sound models to determine if the received audio data has constituent parts that match those of a particular model.

By using a closed-loop system to update and improve existing sound models based on audio data received from users of mobile devices. Although the sound models may have been created using thousands of audio recordings, the audio data may not represent all possible ways in which a product may be used or the different environments the product may be used in. For example, the sound a pressurized beverage container makes may depend on how the user holds the can or the specific position of the user's fingers on the ring-pull. In a further example, the sounds of some consumables being used or opened may differ under different pressures. Thus, the actual sounds generated by use of a product by users can be used to help improve existing models.

More details on how sounds identification models are determined and how new sounds are identified or matched to models can be found respectively in sections 3 and 4 below. If the processing unit establishes that the sound matches a known model, the received sound is considered a 'product use event'. Data associated with the event is then transmitted to a further system or systems which is(are) located externally to the mobile device. The event data may be the location of the mobile device, the time and the date when the product was used (i.e. when the product sound was detected). The location of the mobile device may be determined using the GPS-capability of the mobile device itself. The time and date may be logged by the mobile device's processing unit on receipt of the signal from the microphone. In embodiments, the location and time/date information of the product use event may be transmitted to a system run by the owner of the identified brand, in order to provide them with precise information on the usage of their products. Such information may, for example, enable a brand owner to determine that one of their products is typically used by consumers on weekdays at lunchtime.

In embodiments, the event data may be transmitted to a further system to request additional content from an online service. Preferably, the event data is transmitted to a further system which is configured to deliver content or additional functionality to the mobile device, i.e. a 'reward'. The reward may be, for example, access to an exclusive promotional video linked to the brand, or a monetary reward such as a percentage discount off the user's next purchase of the branded product. The reward may be delivered on a conditional basis, such as when a user has opened/consumed a specific number of the branded beverages. The further system is configured to communicate with the mobile device's operating system to deliver the reward in the appropriate manner (e.g. causing a video to be played or a money-off coupon to be downloaded).

Figure 2:
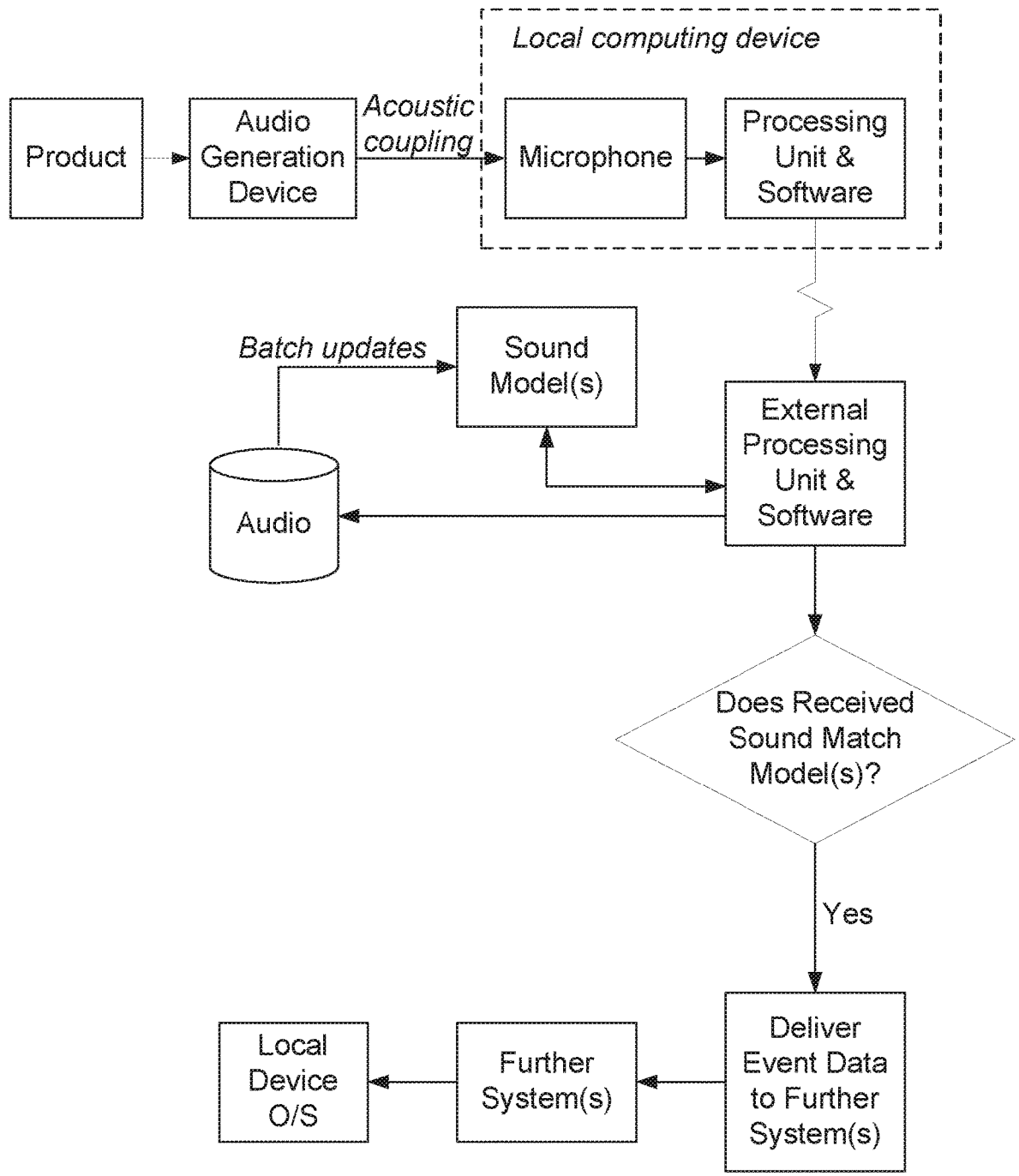
FIG. 2 shows a process to detect brand sonification via the internet in an embodiment of the invention.

Turning now to FIG. 2, this shows a process to detect brand sonification via the internet and cloud computing in an embodiment of the invention. Here, the local computing device (i.e. the user's mobile device) receives a sound for identification, but rather than perform the sound identification analysis on the local processing unit, the sound data is transmitted for analysis to an external processing unit (e.g. to 'the cloud') via a wired or wireless communication channel. Currently, the computational power of many mobile devices limits the ability to perform the sound analysis on the local processing unit. Thus, advantageously, in the embodiment of FIG. 2 the sound analysis is performed via 'the cloud'. The audio data transmitted to 'the cloud' for processing may be a coarser representation of the sound than the original audio, e.g. a Fast Fourier Transform of the original data. This coarser representation is generated by the internal processing unit of the mobile device.

If the received audio data matches a sound model, event data is delivered to a further system as previously outlined with reference to FIG. 1. During the analysis of the audio data, the external processing unit may store the audio data in an audio database. One or more sound models may be stored within 'the cloud' or elsewhere, such that the sound models are accessible to the external processing unit. As mentioned above, the sound models may be updated based on received audio data in order to improve the original models. Thus, the audio data stored within the audio database may be sent to a system for updating the sound models. Preferably, for efficiency, new audio data is only transmitted to the model updating system when a certain number of new audio recordings have been received. Thus, preferably, audio recordings are sent to the model updating system in batches (e.g. after a specific number of new audio recordings is received), and the sound models are updated as described in section 4 below.

Figure 3:
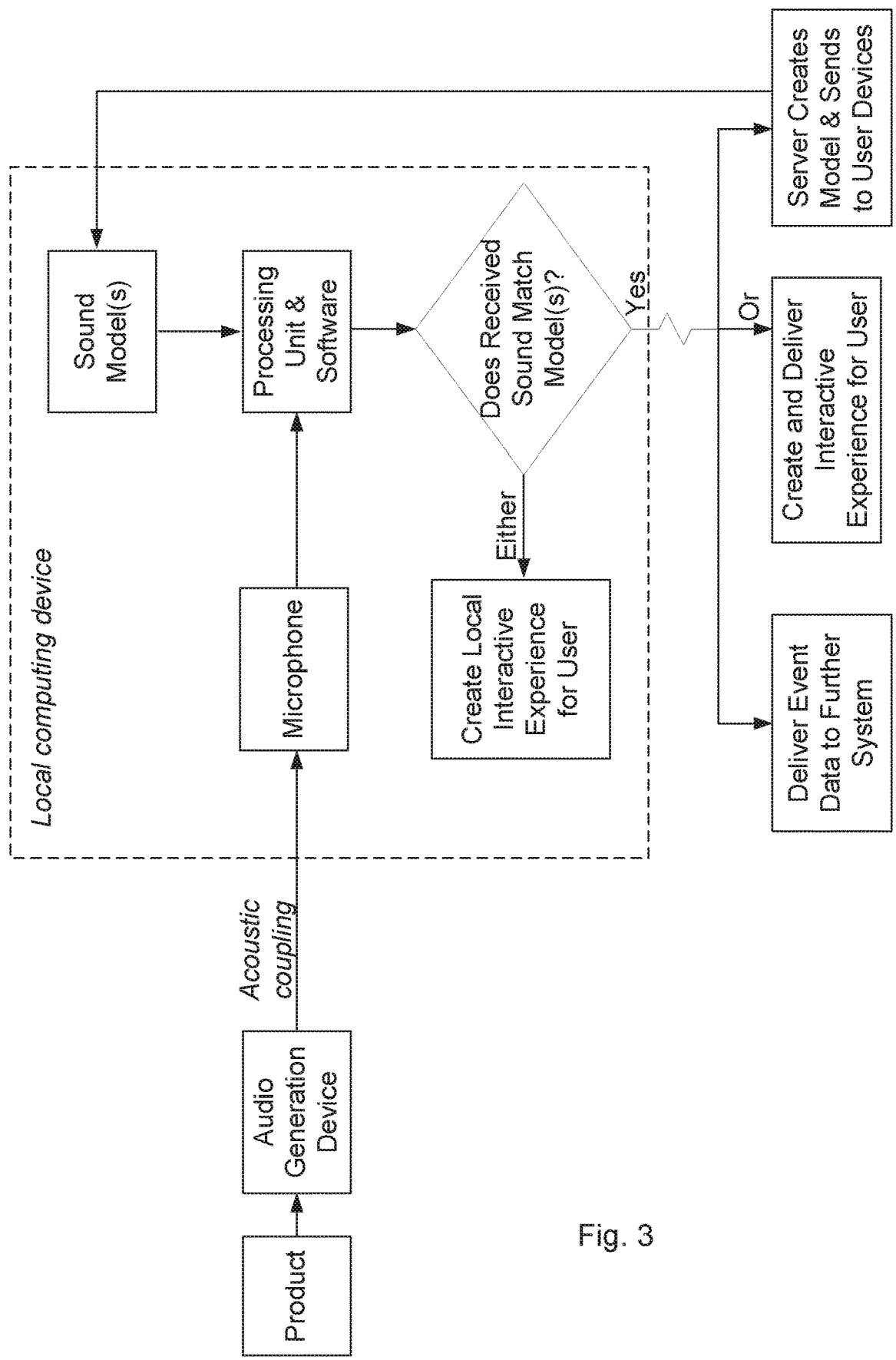
FIG. 3 shows a process to detect brand sonification on a local computing device in an embodiment of the invention.

FIG. 3 illustrates a process to detect brand sonification on a mobile device in another embodiment of the invention. Here, the mobile device processor may have the processing capability required to perform the sound identification analysis. In FIG. 3, the local processing unit is shown to have access to locally stored sound models (i.e. stored on the mobile device), but it may be possible that the sound models are stored externally (e.g. in 'the cloud') and accessed by the local processing unit when perform the sound analysis. The local processing unit may, on successful identification of brand sonification, create and deliver an interactive experience for the user on the mobile device.

In FIG. 3, even though the local processing unit performs the sound analysis, the local processing unit does not perform any updates to the sound models itself. This is because the sound models are ideally updated using audio data collected from multiple users, and the local processing unit does not have access to an audio database. Rather, the received audio data may be transmitted to an externally located server, audio database and model updating system, e.g. located in 'the cloud'. Additionally or alternatively, the updating task may be distributed over a number of different systems, devices or processors, e.g. using a training process distributed in 'the cloud'. New models and updated models created using the user audio data are sent back to user mobile devices in order to enable the local processing unit to perform the sound analysis the next time a sound is received by the device.

As shown in FIG. 3, in one embodiment, the local processing unit may itself create a local interactive experience for the user. Additionally or alternatively, the local processing unit may transmit event data to a further, external system which is configured to create and deliver an interactive experience or reward for the user, as described with reference to FIG. 1. The event data may be delivered to a further system run by the brand owner, in order to provide them with precise information on the usage of their products, as outlined above.

2. Product Modification

As described above, brand owners may be keen to identify when and where their branded products are used or activated and the brand sonification identification process enables them to obtain this information. In the above described embodiments, it may in certain circumstances be difficult to determine the brand owner from the audio data alone. For example, many drinks manufacturers use similar or standard containers for their drinks, which make the same or similar sounds when they are opened. In this situation, the user may be required to input further information into their mobile device before a 'reward' is delivered. For instance, once the sound identification process has determined that the sound represented the opening of a pressurized beverage can, the user may be prompted to input the brand owner or select the brand owner from a list provided by the local processing unit. Thus, brand owners may wish to modify their product packaging in order to achieve brand sonification.

Figure 4A:
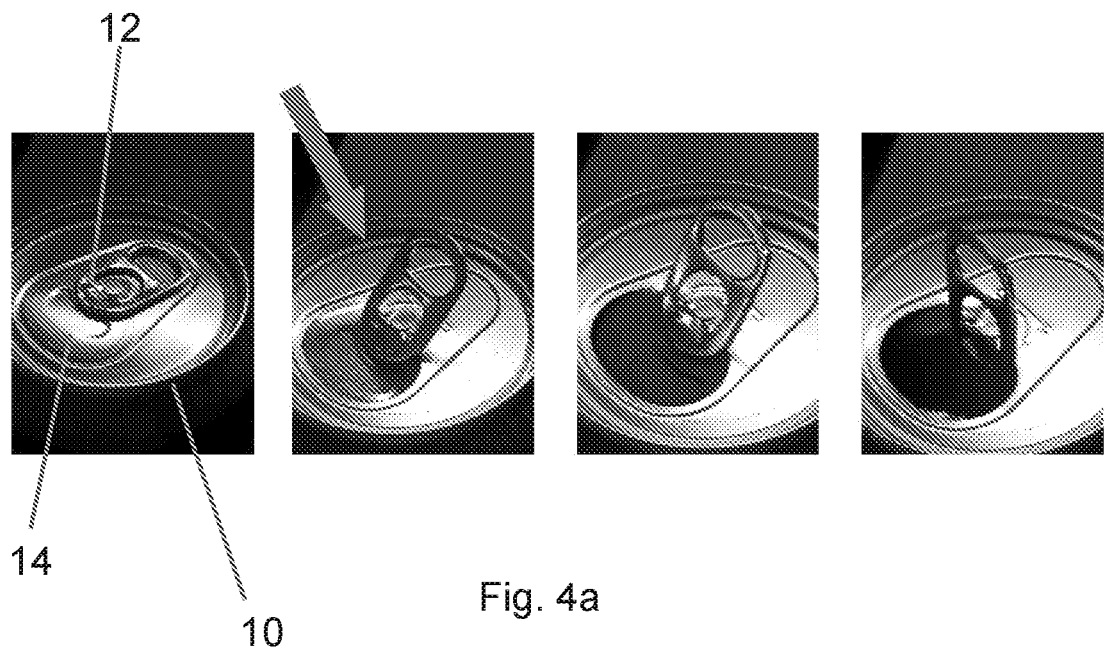
FIG. 4a illustrates the mechanism of opening a typical pressurized can and FIG. 4b illustrates an example can modification to increase product sound distinctiveness.
Figure 4B:
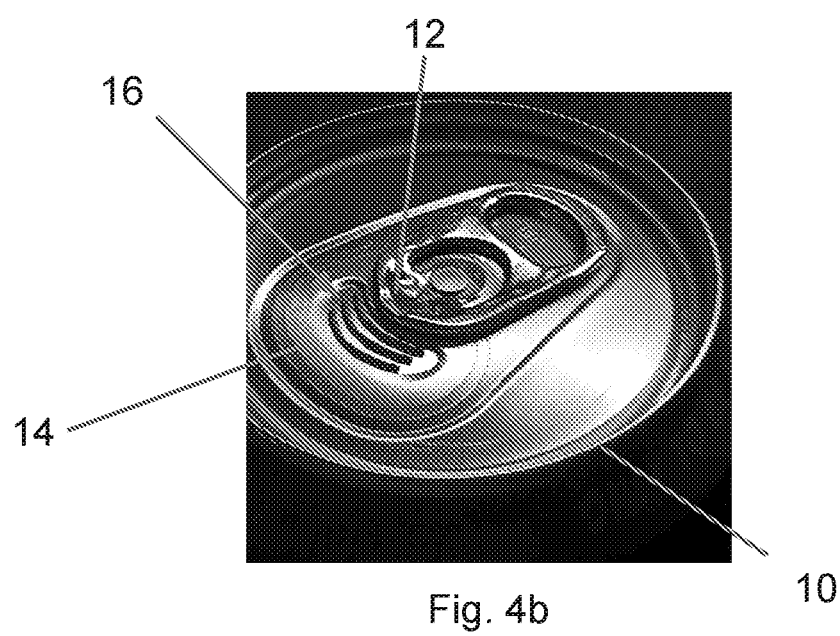

Turning now to FIG. 4a, this shows a series of pictures illustrating the process of opening a typical pressurized beverage can 10 which comprises a ring pull 12 (also known as a pull-tab) attached at a rivet to the lid of the can. The lid is perforated or scored to define a tab 14 in the lid. As shown in FIG. 4a, pulling the ring pull 12 causes the tab-end of the ring pull 12 to exert a downwards force on the tab 14, and eventually causes the tab 14 to be pushed into the can to create an opening. Many drinks manufacturers use the same ring pull design and use the same can shape and size for their beverages, and thus, it can be difficult to distinguish between brands based on the sound created upon pulling the ring pull and opening the can. However, brand owners may be able to achieve brand sonification by modifying the ring pull. For example, FIG. 4b shows a modified tab 14 on a can 10. The tab 14 comprises one or more ridges 16 which can cause a specific, distinctive sound to be created when the ring pull is pulled to open the can. The ring pull 12 may modified (not shown) so that it interacts with the ridges when pulled. For instance, the tab-end of the ring pull 12 may be extended so that it runs over the one or more ridges 16 when it is operated in the usual way. Or, the ring pull and rivet may be configured to enable the tab-end of the ring pull to slide over the ridges 16, such that as the ring pull is moved from the horizontal position (on the left-hand side of FIG. 4a) into the vertical/upright position (on the right-hand side of FIG. 4a), the ring pull 12 is successively brought into contact with ridges 16 to cause a series of "clicks". Such modifications may enable a specific sound to be created when the can is opened, which can then be more easily determined as brand sonification by the sound analysis process.

3. Sound Identification

The applicant's PCT application WO2010/070314, which is incorporated by reference in its entirety, describes in detail various methods to identify sounds. Broadly speaking an input sample sound is processed by decomposition into frequency bands, and optionally de-correlated, for example, using PCA/ICA, and then this data is compared to one or more Markov models to generate log likelihood ratio (LLR) data for the input sound to be identified. A (hard) confidence threshold may then be employed to determine whether or not a sound has been identified; if a "fit" is detected to two or more stored Markov models then preferably the system picks the most probable. A sound is "fitted" to a model by effectively comparing the sound to be identified with expected frequency domain data predicted by the Markov model. False positives are reduced by correcting/updating means and variances in the model based on interference (which includes background) noise.

There are several practical considerations when trying to detect sounds from compressed audio formats in a robust and scalable manner. Where the sound stream is uncompressed to PCM (pulse code modulated) format and then passed to a classification system, the first stage of an audio analysis system may be to perform a frequency analysis on the incoming uncompressed PCM audio data. However, the recently compressed form of the audio may contain a detailed frequency description of the audio, for example where the audio is stored as part of a lossy compression system. By directly utilising this frequency information in the compressed form, i.e., sub-band scanning in an embodiment of the above still further aspect, a considerable computational saving may be achieved by not uncompressing and then frequency analyzing the audio. This may mean a sound can be detected with a significantly lower computational requirement. Further advantageously, this may make the application of a sound detection system more scalable and enable it to operate on devices with limited computational power which other techniques could not operate on.

The digital sound identification system may comprise discrete cosine transform (DCT) or modified DCT coefficients. The compressed audio data stream may be an MPEG standard data stream, in particular an MPEG 4 standard data stream.

The sound identification system may work with compressed audio or uncompressed audio. For example, the time-frequency matrix for a 44.1 KHz signal might be a 1024 point FFT with a 512 overlap. This is approximately a 20 milliseconds window with 10 millisecond overlap. The resulting 512 frequency bins are then grouped into sub bands, or example quarter-octave ranging between 62.5 to 8000 Hz giving 30 sub-bands.

A lookup table is used to map from the compressed or uncompressed frequency bands to the new sub-band representation bands. For the sample rate and STFT size example given the array might comprise of a (Bin size÷2)×6 array for each sampling-rate/bin number pair supported. The rows correspond to the bin number (centre)—STFT size or number of frequency coefficients. The first two columns determine the lower and upper quarter octave bin index numbers. The following four columns determine the proportion of the bins magnitude that should be placed in the corresponding quarter octave bin starting from the lower quarter octave defined in the first column to the upper quarter octave bin defined in the second column. e.g. if the bin overlaps two quarter octave ranges the 3 and 4 columns will have proportional values that sum to 1 and the 5 and 6 columns will have zeros. If a bin overlaps more than one sub-band more columns will have proportional magnitude values. This example models the critical bands in the human auditory system. This reduced time/frequency representation is then processed by the normalization method outlined. This process is repeated for all frames incrementally moving the frame position by a hop size of 10 ms. The overlapping window (hop size not equal to window size) improves the time-resolution of the system. This is taken as an adequate representation of the frequencies of the signal which can be used to summarise the perceptual characteristics of the sound. The normalization stage then takes each frame in the sub-band decomposition and divides by the square root of the average power in each sub-band. The average is calculated as the total power in all frequency bands divided by the number of frequency bands. This normalised time frequency matrix is the passed to the next section of the system where its mean, variances and transitions can be generated to fully characterize the sound's frequency distribution and temporal trends. The next stage of the sound characterization requires further definitions. A continuous hidden Markov model is used to obtain the mean, variance and transitions needed for the model. A Markov model can be completely characterized by $\lambda=(A, B, \Pi)$ where A is the state transition probability matrix, B is the observation probability matrix and $\Pi$ is the state initialization probability matrix. In more formal terms:

$$A=\lfloor a_{ij} \rfloor \text{ where } a_{ij}=P(q_{t+1}=S_j|q_t=S_i)$$

$$B=\lfloor b_j(m) \rfloor \text{ where } b_j(m)=P(O_t=v_m|q_t=S_j)$$

$$\Pi=[\pi_i] \text{ where } \pi_i=P(q_1=S_i)$$

where q is the state value, O is the observation value. A state in this model is actually the frequency distribution characterised by a set of mean and variance data. However, the formal definitions for this will be introduced later. Generating the model parameters is a matter of maximizing the probability of an observation sequence. The Baum-Welch algorithm is an expectation maximization procedure that has been used for doing just that. It is an iterative algorithm where each iteration is made up of two parts, the expectation $\varepsilon_t(i, j)$ and the maximization $\gamma_t(i)$. In the expectation part, $\varepsilon_t(i, j)$ and $\gamma_t(i)$, are computed given $\lambda$, the current model values, and then in the maximization $\lambda$ is step recalculated. These two steps alternate until convergence occurs. It has been shown that during this alternation process, $P(O|\lambda)$ never decreases. Assume indicator variables $z_i^t$ as Expectation $$\varepsilon_t(i, j) = \frac{\alpha_t(i) a_{ij} b_j(O_{t+1}) \beta_{t+1}(j)}{\sum_k \sum_l \alpha(k) a_{kl} b_l(O_{t+1}) \beta_{t+1}(l)}$$

$$\gamma_t(i) = \sum_{j=1}^{N} \varepsilon_t(i, j)$$

$$E[z_i^t] = \gamma_t(i) \text{ and } [z_{ij}^t] = \varepsilon_t(i, j)$$

$$z_i^t = \begin{cases} 1 & \text{if } q_t = S_i \\ 0 & \text{otherwise} \end{cases}$$

$$z_{ij}^t = \begin{cases} 1 & \text{if } q_t = S_i \text{ and } q_{t+1} = S_j \\ 0 & \text{otherwise} \end{cases}$$

Maximisation $$\hat{a}_{ij} = \frac{\sum_{k=1}^{K} \sum_{t=1}^{T_k-1} \varepsilon_t^k(i, j)}{\sum_{k=1}^{K} \sum_{t=1}^{T_k-1} \gamma_t^k(i)}$$

$$\hat{b}_j(m) = \frac{\sum_{k=1}^{K} \sum_{t=1}^{T_k-1} \gamma_t^k(j) 1(O_t^k = v_m)}{\sum_{k=1}^{K} \sum_{t=1}^{T_k-1} \gamma_t^k(j)}$$

$$\hat{\pi} = \frac{\sum_{k=1}^{K} \gamma_1^k(i)}{K}$$

Gaussian mixture models can be used to represent the continuous frequency values, and expectation maximization equations can then be derived for the component parameters (with suitable regularization to keep the number of parameters in check) and the mixture proportions. Assume a scalar continuous frequency value, $O_t \in \Re$ with a normal distribution $$p(O_t|q_t=S_j,\lambda) \sim N(\mu_j,\sigma_j^2)$$

This implies that in state $S_j$, the frequency distribution is drawn from a normal distribution with mean $\mu_j$ and variance $\sigma_j^2$. The maximization step equation is then $$\hat{\mu}_j = \frac{\sum_t \gamma_t(j) O_t}{\sum_t \gamma_t(j)}$$

-continued $$\hat{\sigma}_j^2 = \frac{\sum_t \gamma_t(j)(O_{t-1} - \hat{\mu}_j)^2}{\sum_t \gamma_t(j)}$$

The use of Gaussians enables the characterization of the time-frequency matrix's features. In the case of a single Gaussian per state, they become the states. The transition matrix of the hidden Markov model can be obtained using the Baum-Welch algorithm to characterize how the frequency distribution of the signal change over time.

The Gaussians can be initialized using K-Means with the starting points for the clusters being a random frequency distribution chosen from sample data.

4. Matching New Sounds to Model(s)

To classify new sounds and adapt for changes in the acoustic conditions, a forward algorithm can be used to determine the most likely state path of an observation sequence and produce a probability in terms of a log likelihood that can be used to classify and incoming signal. The forward and backward procedures can be used to obtain this value from the previously calculated model parameters. In fact only the forward part is needed. The forward variable $\alpha_t(i)$ is defined as the probability of observing the partial sequence $\{O_1 \ldots O_t\}$ until time t and being in $S_i$ at time t, given the model $\lambda$.

$$\alpha_t(i) = P(O_1 \ldots O_t, q_t = S_i|\lambda)$$

This can be calculated by accumulating results and has two steps, initialization and recursion. $\alpha_t(i)$ explains the first t observations and ends in state $S_i$. This is multiplied by the probability $\alpha_{ij}$ of moving to state $S_j$, and because there are N possible previous states, there is a need to sum over all such possible previous $S_i$. The term $b_j(O_{t+1})$ is then the probability of generating the next observation, frequency distribution, while in state $S_j$ at time t+1. With these variables it is then straightforward to calculate the probability of a frequency distribution sequence.

$$P(O|\lambda) = \sum_{i=1}^{N} \alpha_T(i)$$

Computing $\alpha_t(i)$ has order $O(N^2 T)$ and avoids complexity issues of calculating the probability of the sequence. The models will operate in many different acoustic conditions and as it is practically restrictive to present examples that are representative of all the acoustic conditions the system will come in contact with, internal adjustment of the models will be performed to enable the system to operate in all these different acoustic conditions. Many different methods can be used for this update. For example, the method may comprise taking an average value for the sub-bands, e.g. the quarter octave frequency values for the last T number of seconds. These averages are added to the model values to update the internal model of the sound in that acoustic environment.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:
1. A mobile device comprising:
   a microphone;

memory storing machine-readable instructions; and
a processor configured to access the memory and execute the machine readable instructions, the machine readable instructions when executed cause the processor to:
receive audio data obtained from a sound in an environment that is captured by the microphone, wherein the sound is generated by a product as a result of a use of said product in said environment, and wherein the generated sound is a characteristic of said product;
process said audio data to determine a product use event associated with the use of said product;
determine a brand of the product that generated the sound based at least on said processing of said audio data;
provide a user reward in response to said determination of said brand of said product;
capture data associated with said product use event; and
transmit said captured data associated with the produce use event to a remote computer system for analysis.

2. A mobile device as claimed in claim 1 wherein the sound generated by the product during said use of said product comprises a sound of opening a package of said product.

3. A mobile device as claimed in claim 2 wherein the sound generated by the product during said use of said product comprises a sound of a can ring-pull/tab opening event on a can of pressurized beverage.

4. A mobile device as claimed in claim 2 wherein the sound generated by the product during said use of said product comprises a sound of a screw cap twisting and opening event on a beverage bottle.

5. A mobile device as claimed in claim 1 wherein said user reward is only delivered when said software processor has detected a specific number of product use events.

6. A non-transitory data carrier carrying processor control code which when executed on a processor of a mobile device:
receives audio data obtained from a sound in an environment that is captured by a microphone of the mobile device, wherein the sound is generated by a product as a result of a use of said product in said environment, and wherein the generated sound is a characteristic of said product;
processes said audio data to determine a product use event associated with the use of said product;
processes at least said audio data to determine a brand of said product that generated the sound;
provides a user reward in response to said determination of said brand of said product;
captures date associated with said product use event; and
transmit said captured data associated with the product use event to a remote computer system for analysis.

7. A mobile device as claimed in claim 1 wherein said use of said product comprises one or more of: using said product, activating said product, opening said product, and consuming said product.

8. A mobile device as claimed in claim 1 wherein the sound is generated by an audio generation device of the product.

9. A mobile device as claimed in claim 1 wherein the processor is configured to provide said captured data to said remote computer system for analysis in response to the determination of said brand of said product.

10. A mobile device as claimed in claim 1 wherein determining said brand of the product is further based on a user input.

11. A mobile device comprising:
memory storing machine-readable instructions;
a processor configured to access the memory and execute the machine readable instructions, the machine readable instructions when executed cause the processor to:
receive audio data obtained from a sound captured in an environment, wherein the sound is generated by a product as a result of a use of said product in said environment, said use of said product comprising one or more of: using said product, activating said product, opening said product, and consuming said product; and wherein the generated sound is characteristic of said product;
process said audio data to determine a product use event associated with the use of said product;
determine a brand of the product that generated the sound based at least on said processing of said audio data;
provide a user reward in response to said determination of said brand of said product;
capture data associated with said product use event; and
transmit said captured data associated with said product use event to a remote computer system for analysis.

* * * * *